Jan. 3, 1939. W. MAIER 2,142,448
CUTTING MECHANISM
Filed Oct. 14, 1937 4 Sheets-Sheet 3

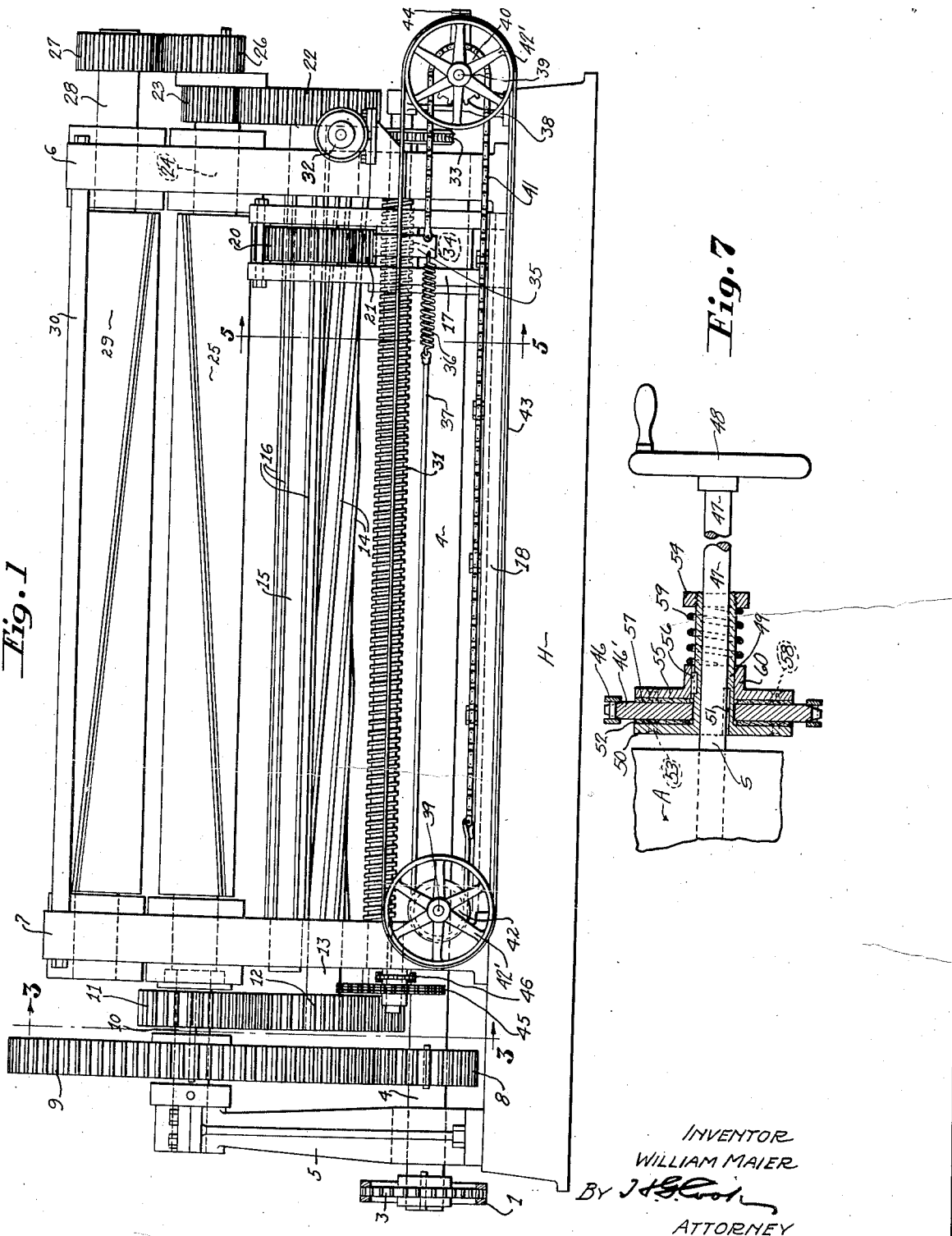

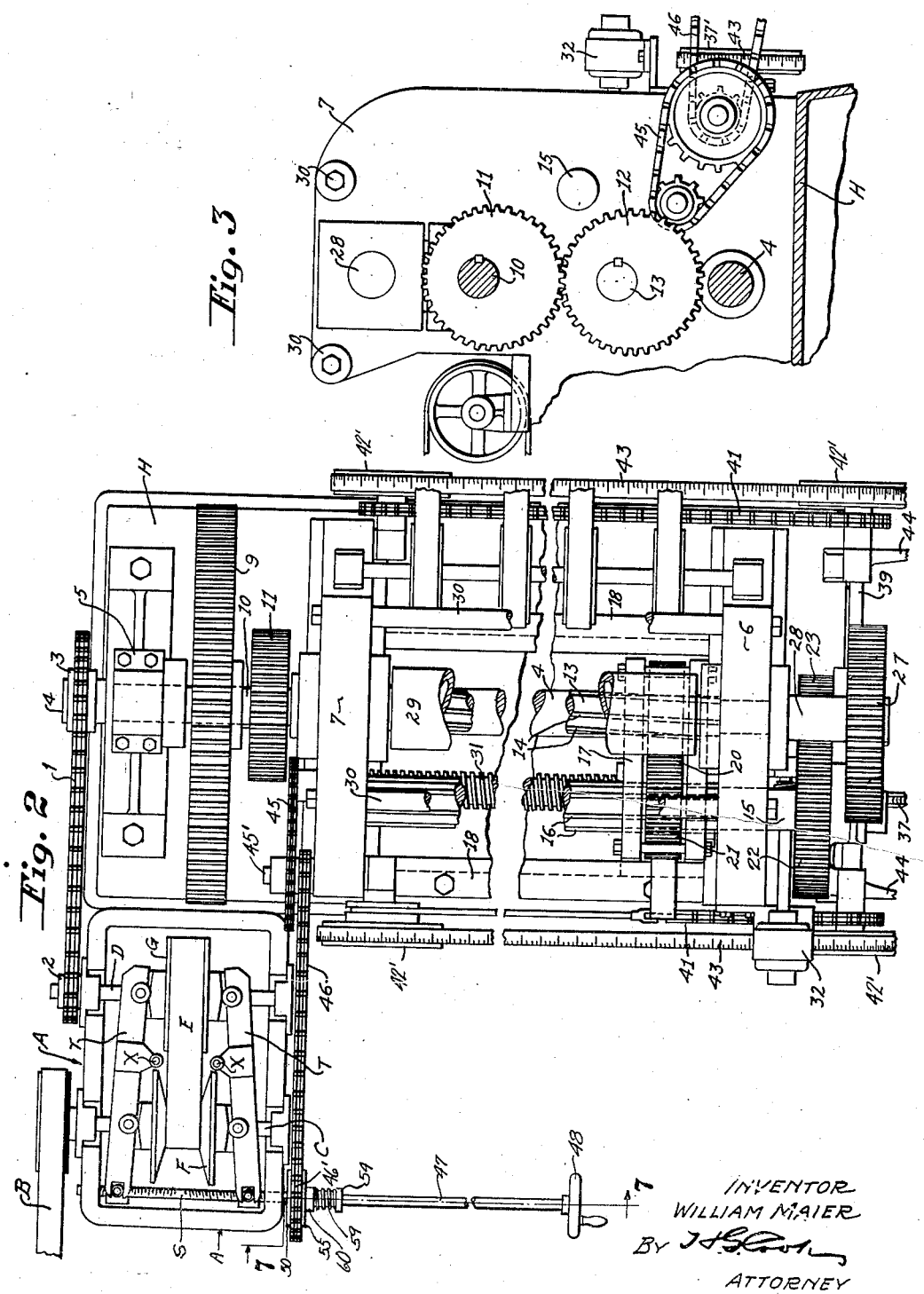

INVENTOR
WILLIAM MAIER
BY J.T.G.Cook
ATTORNEY

Jan. 3, 1939.  W. MAIER  2,142,448
CUTTING MECHANISM
Filed Oct. 14, 1937  4 Sheets—Sheet 4

Inventor
William Maier
By J.S.Cook
Attorney

Patented Jan. 3, 1939

2,142,448

UNITED STATES PATENT OFFICE 2,142,448

CUTTING MECHANISM

William Maier, St. Louis, Mo.

Application October 14, 1937, Serial No. 168,864

5 Claims. (Cl. 164—68)

My invention relates to a continuously rotating cutting mechanism for cutting into sections continuously moving sheet material, preferably of lengths varying from 30 to 120 inches.

An object of my invention is to provide a relatively simple mechanical arrangement for adjusting the rotating movement of the rotating cutter so that different lengths of sheet material may be severed, and which adjustment is under the control of the operator of the structure, such adjustment being operable without interrupting the operation of the cutting device.

Fig. 1 is an end view of my improved cutting device.

Fig. 2 is a top, plan view, partly broken away, of my improved cutting device.

Fig. 3 is a sectional view showing the elliptical gears for driving the cutting rolls, taken on the line 3—3, Fig. 1.

Fig. 7 is a view of a hand-controlled device for adjusting the Reeves drive, and is taken on the line 7—7, Fig. 2.

Figure 5:
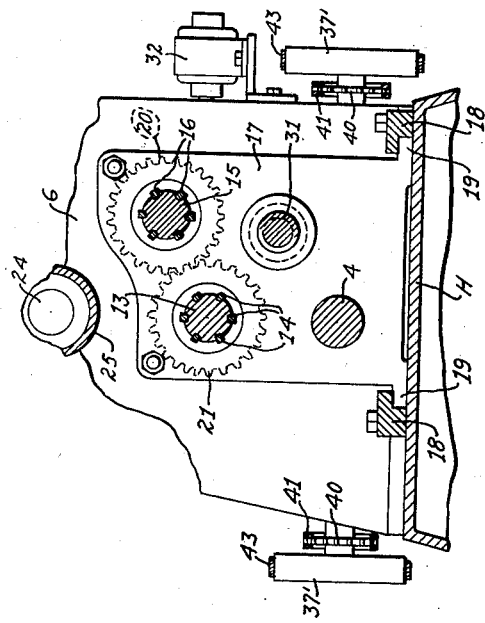
Fig. 5 is a view taken on the line 5—5 of Fig. 1, looking in the direction of the arrows.

In the drawings, A designates the variable speed drive mechanism of any conventional type, that illustrated being the well known Reeves drive, which is driven by a belt B from a motor (not shown). The drive shaft C operates the driven shaft D through the belt E connecting the pulleys F and G. The pulleys F and G are controlled by a threaded rod S which extends transversely of the Reeves drive, near one end thereof, which rod S is rotatable by mechanism hereinafter to be described. The pitch of the threads on said rod S are so arranged that on one side of the center of said rod one set of threads are pitched in one direction while on the other side of the center the threads are pitched in the opposite direction, so as to cause the ends of the arms T, which are connected to said rod S, to move toward or away from each other when the rod S is rotated. Such movement of the arms T through the threaded rod S moves the pulleys F and the pulleys G toward or away from each other, as both sets of said pulleys are connected to said members T. The members T are fulcrummed as at X in the Reeves drive A intermediate of the pulleys F and the pulleys G, so that as the members T are moved by the rotation of the threaded rod S the pulleys F are moved toward or away from each other, depending on the direction of movement of the threaded rod S, while the pulleys G are moved in a direction opposite to that of the pulleys F. Thus the belt E is moved upwardly or downwardly on the inclined inner faces of the pulleys F and G, and thus the change in speed of the driving shaft D in said Reeves drive is controlled, as is well known to those familiar with such speed drive mechanisms, particularly the Reeves drive.

A sprocket chain 1 is mounted on a sprocket wheel 2 on one end of the driven shaft D, and is also connected to a sprocket wheel 3 on the drive shaft 4 which is journaled in the standard 5 near the bottom thereof, said standard being mounted on the frame H of the device. The drive shaft 4 extends substantially across the entire device and is journaled at its opposite end in the end frame 6 mounted on the frame H of the device across from the side on which is mounted the standard 5. Another end frame is designated by the numeral 7 and assists in the support of the main operating members of my cutting mechanism.

Mounted on the drive shaft 4 is a small gear wheel 8 which meshes with a larger gear wheel 9 carried by a stub shaft 10 journaled in the upper end of the standard 5 and the end frame 7. The eccentric gear wheel 11 is also eccentrically mounted on the stub shaft 10 and meshes with another eccentric gear wheel 12 eccentrically mounted on a shaft 13, which extends substantially across the entire device and is journaled in the end frames 6 and 7.

14 designates a series of ribs longitudinally mounted on the shaft 13 which extend spirally about the shaft 13 and approximately at 180° around its circumference. 15 designates another shaft parallel with shaft 13 and which is provided with ribs 16 extending longitudinally of such shaft 15 approximately its full length in a straight line.

17 designates a slidable carriage which is adapted to slide transversely of the device beneath the rails 18 mounted on the frame H, the extensions 19 on the carriage 17 extending beneath said rails 18 and the frame H (see Fig. 5).

The means for sliding said carriage 17 will be hereinafter described.

Figure 6:
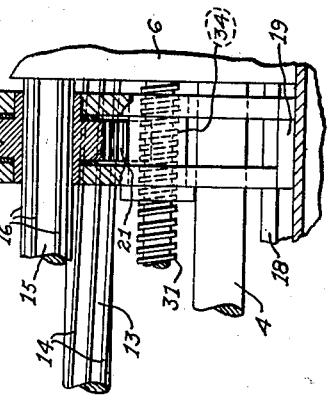
Fig. 6 is a detail view, partly in section, showing the mechanism for adjusting the rotary cutters for cutting different lengths of the traveling material.

Rotatably journaled in the carriage 17 are two spur gear wheels 20 and 21 (see Figs. 5 and 6), through the centers of which pass, respectively, the shafts 15 and 13. Transverse slots are provided in the hubs of these gear wheels 20 and 21 to receive the ribs 14 and 16, so that said gear wheels may slide freely along the shafts 13 and 15 while at the same time imparting rotary movement to said shafts. The spur gears 20 and 21 are in mesh with each other. The shaft 13, being driven by the gear wheel 12, imparts rotary movement to the shaft 15 through the intermeshing gears 20 and 21 in whatever position the slidable carriage 17 may occupy transversely of the device. When the shaft 4 is driven by the chain 1 connected with the Reeves drive A, the gear wheel 8 is rotated, and as said gear wheel 8 meshes with the large gear wheel 9 carried by the spur shaft 10, the gear wheel 9 is also rotated, as well as the spur shaft 10. Also eccentrically mounted on shaft 10 is an eccentric gear wheel 11 which meshes with another eccentric gear wheel 12 eccentrically mounted on shaft 13. In Figs. 2 and 3 the mechanism illustrated shows the cutting device in position for cutting the longest sheets of the material passing therethrough. Rotation of shaft 10 causes the rotation of the eccentric gear wheel 11 meshing with the eccentric gear wheel 12, thereby rotating the shaft 13 on which said gear wheel 12 is mounted.

Referring to Fig. 3, as the gear wheels 11 and 12 rotate they gradually decrease the speed cycle of shaft 13 in regard to shaft 10, until they have made a half-turn, when the speed cycle of shaft 13 is caused to regain, progressively, its original speed cycle. As the shaft 13 is rotated, the gear wheel 21 in the transversely movable carriage 17 is also rotated (as such gear wheel is carried by shaft 13), and such rotation of gear wheel 21 causes the rotation of gear wheel 20 carried on the shaft 15, thereby rotating said shaft 15 at the same speed as shaft 13. Now, then, the transverse carriage 17, when moved transversely of the device, will cause the position of shaft 15 to change with respect to the position of shaft 13. This also changes the speed cycle of shaft 15 with relation to stub shaft 10. On the end of shaft 15, opposite the end on which is mounted the eccentric gear 12, is mounted for rotation therewith gear wheel 22 which meshes with gear wheel 23 which is mounted on the journal of the lower cutter roll 25. The gear wheel 23 makes two revolutions to one revolution of gear wheel 22. On the same journal of the lower cutter roll 25 is eccentrically mounted an eccentric gear wheel 26, adjacent gear wheel 22, which meshes with a quick-return gear 27, mounted on shaft 28, the gear wheel 26 making two revolutions to one of quick-return gear 28. The purpose of this is to provide for cutting a sheet up to 120 inches. If the cutting took place on each revolution of the lower cutter roll 25 instead of on each two revolutions thereof, a sheet only half the length required could be cut. The teeth on the gear wheels 26 and 27 are so arranged that at the beginning of the cutting period the speed of travel of the upper and lower cutter rolls is synchronized to the speed of movement of the material to be cut, and such synchronized movement is maintained during the entire cutting operation, after which the idling movement of the cutter rolls is controlled so that at the proper time said cutter rolls will be brought into cutting position to effect the length of cut determined by the position of the traveling carriage 17, which travels transversely of the device, and the change of speed in the speed-changing device. As the carriage 17 is shifted transversely of the machine, the gears 20 and 21 (journaled in said carriage) travel with said carriage and are slidingly keyed to the respective shafts 13 and 15. The result of this transverse movement of the carriage 17 is to change the position only of the shafts 13 and 15 relatively to each other, but not their speed of rotation.

Figure 4:
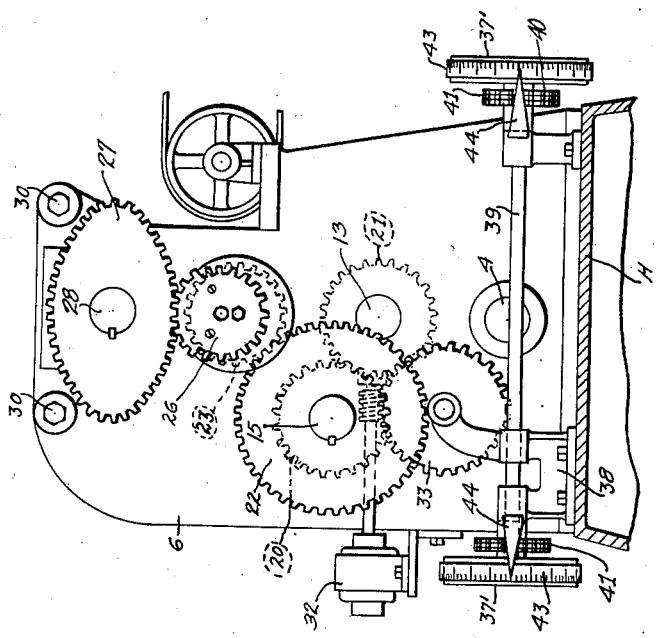
Fig. 4 is a side view taken from the side opposite Fig. 3 and showing the gears for operating the adjustment devices for varying the length of cut of the traveling material.

The gear ratio between the gears 26 and 27 is two revolutions of gear 26 to one of gear 27. The gear 26 has teeth on the periphery thereof, a portion of which are on a radius taken on the center of the mounting of said gear on the journal 24, while the remainder of said teeth are on a radius taken on a center above said first-named center (see Fig. 4). The purpose of this is to cause the cutter rolls 25 and 29 during the entire cutting operation to be synchronized with the speed of travel of the material to be cut which passes between said cutter rolls. The journals 24 and 28 are mounted in the end frames 6 and 7, and 30 designates transverse bolts for stiffening the upper portions of end frames 6 and 7.

31 designates a feed screw transversely mounted between the end frames 6 and 7 and adapted to be rotated by means of an electric motor 32 mounted on the end frame 6 and under the control of the operator of the cutting device. The motor is adapted to rotate a worm gear 33 mounted on the feed screw 31, whereby rotary motion is imparted to said feed screw. The slidable carriage 17 is provided with a threaded portion 34 beneath its median line for the reception of the feed screw 31, and by virtue of which said carriage is moved across the width of the device when the feed screw 31 is rotated. 35 designates an arm depending from the carriage 17 to which is attached a spring 36 which is secured to a wire rope 37, which in turn is secured to the sprocket chain 41 which meshes with the sprocket wheel 40 on the shaft 39. The feed screw 31 is journaled in the standard 7 and a short standard 38, both mounted on the frame H.

On the end of the shaft which extends beyond the housing 7 is mounted a small wheel which operates the feed screw 31 and the sprocket chain 45, which chain passes over another and larger sprocket wheel mounted on a stub shaft 45'. Also mounted on said stub shaft 45' is a larger sprocket wheel, which is connected by a chain 46 with a sprocket wheel mounted on one end of the screw-threaded rod S of the Reeves drive. By this means a reduction of speed of movement between the shaft 13 and the screw-threaded rod S is obtained. Also, by these means is the change in speed in the Reeves drive primarily obtained. I have provided an additional hand-controlled device which is also connected to the same end of the screw-threaded rod S on which is mounted the sprocket wheel above referred to. This hand-controlled mechanism will be hereinafter referred to.

On the shaft 39 is a sprocket wheel 40 by means of which a combination sprocket chain and wire rope member 41 is driven. Another sprocket wheel 42 over which the member 41 passes is also provided. When the feed screw 31 is rotated, the member 41 is driven across the device in one direction or the other, according as the feed screw 31 is rotated by the motor 32.

Two wheels 42' attached to the shaft 39 are rotated, and extending across the device from one wheel 39 to the other are belts 43 which are indexed in inches, and 44 are pointers carried by the frame H, so that the operator may determine how many inches in length the traveling web of material will be severed.

The means for regulating the cutters 25 and 29 will now be described. If cuts of 72 inch lengths be desired, the operator of the device starts the motor 32 which, through the feed screw 31 rotates the wheels 42', which moves the chain belts 41 and indexed belts 43. When the numeral "72" on the indexed belts 43 registers with the pointers 44 (see Fig. 4), then the motor 32 is stopped and the speed cycle of the cutters 25 and 29 are so regulated, together with the variable speed drive, that they will sever the traveling web of material every 72 inches. This regulation is accomplished by moving the slidable carriage 17 to the left (see Fig. 1). The gear wheels 20 and 21, being slidable along the shafts 13 and 15, with the ribs 14 and 16 passing through the axial openings in said gear wheels 20 and 21, the upper shaft 15 with the straight ribs 16 thereon is caused to change its position toward the shaft 13 as the slidable carriage 17 moves along said shafts 13 and 15.

In Figs. 2 and 7 I have shown a manually-controlled means for changing the speed of the Reeves drive. To one end of the screw-threaded rod S I secure a shaft 47, which is actually an extension of the rod S, and at the outer end of the shaft 47 is secured a hand wheel 48, which hand wheel may be located at a point convenient to the reach of the operator of my cutting device. The sprocket wheel 46' normally controls the rotation of the screw-threaded rod S through the movement of the carriage 17, as hereinbefore described. The sprocket wheel 46' is mounted on the hub 49 of the circular member 50, which member is keyed to the shaft 49, as shown at 51. To the inner face of the circular member 50 is attached a leather facing 52 by rivets 53. The hub 49 extends beyond the sprocket wheel 46', and on the outer end of said hub is mounted a collar 54, screw-threaded upon said hub 49. Another circular member 55 is mounted on the hub 49 and keyed thereto by the key 56. On the inner face of the member 55 is a leather facing 57 held in place by the rivets 58. The member 58 and the member 50 are normally held in friction engagement with the sprocket wheel 46' by the spring 59 which surrounds the hub 49 and is located between the collar 54 and the hub 60 on the circular member 55. By this arrangement the screw-threaded rod S may be manually rotated by the hand wheel 48 without moving the sprocket wheel 46', the leather facings 52 and 57 slipping on the faces of the sprocket wheel 46' (with which they contact; see Fig. 7), when the hand wheel 48 is manipulated. The sprocket wheel 46', when rotated through the movement of the carriage 17, rotates the circular members 50 and 55, and therethrough rotates the screw-threaded rod S.

The Reeves drive A is affected by the rotation of the feed screw 31 through the sprocket chains 45 and 46 mounted on the reduction gears adapted to reduce the movement transmitted to the threaded rod S in said Reeves drive, as herein previously described. In Fig. 2 these sprocket chains 45 and 46 are shown leading from the feed screw 31 to the screw-threaded rod S on the Reeves drive A, which screw determines the speed of drive of said Reeves drive through operation of the two levers T, as also previously described. By controlling the Reeves drive, and the speed cycle of the cutter rolls 25 and 29, through the eccentric gears 11 and 12 and the carriage 17, the speed cycle of rotation of said cutter rolls may be definitely determined and the indexed gauges 43 will accurately represent the number of inches of the traveling web of material that is to be severed. Accuracy of the speed of the cutter is assured by the hand-controlled device, previously described, whereby the operator may rotate the screw-threaded rod S of the Reeves drive independently of the machine-controlled device for such purpose.

Figure 8:
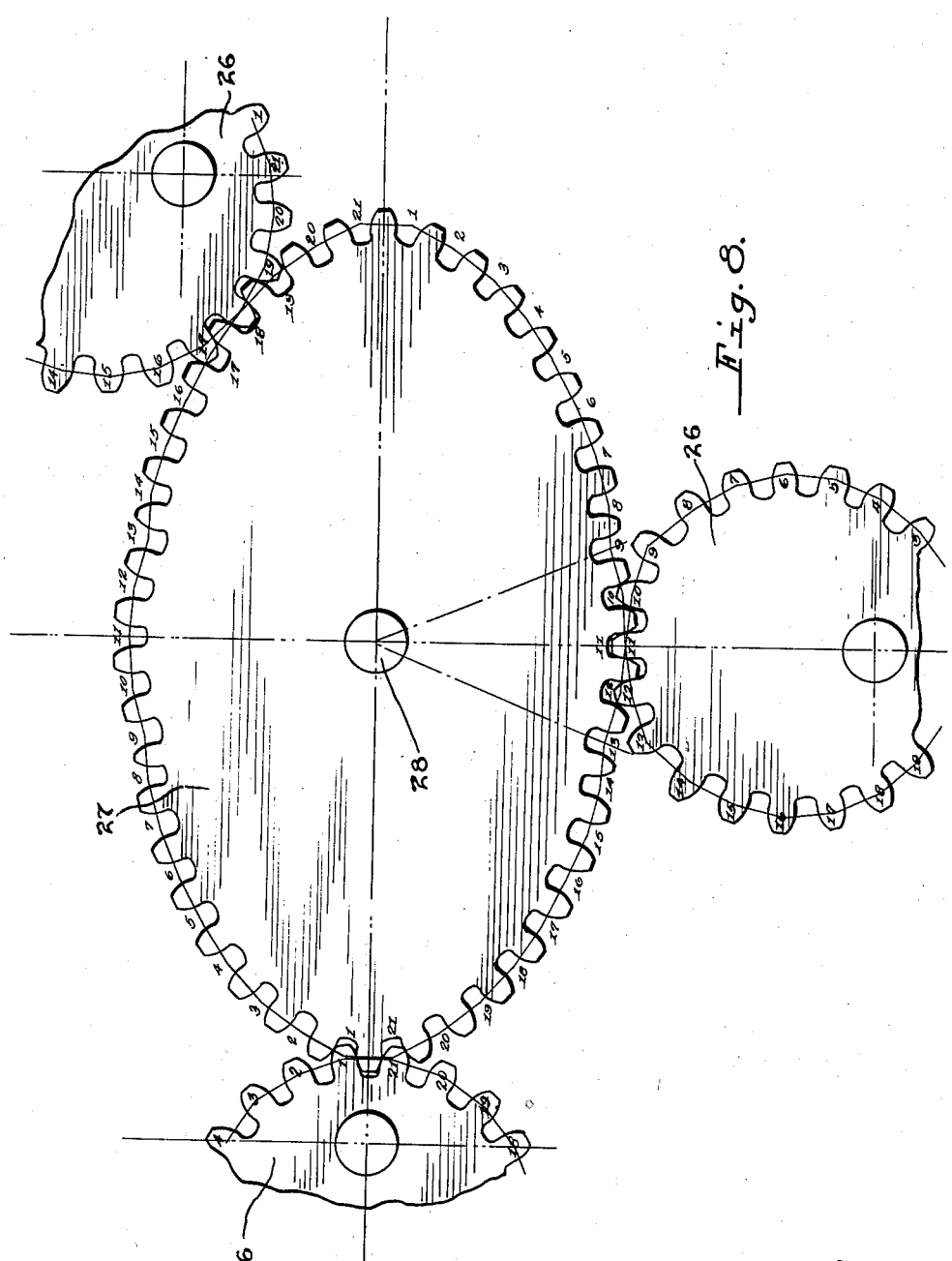
Fig. 8 is a diagrammatic view showing the positions of the eccentric gear in relation to the oblong gear as shown in Fig. 4.

In Fig. 8 I have diagrammatically shown how the gears 26 and 27 intermesh at the several points of rotation, the centers of the said gears remaining fixed but the eccentrically mounted gear 26 changes the position of said gear as it rotates to accommodate the changing diameter of gear wheel 27 as it rotates. For convenience I have numbered the teeth on eccentric gear wheel 26 from 1 to 21, which mesh with two series of teeth numbered from 1 to 21 from right to left at the bottom of gear wheel 27, and also numbered from 1 to 21 from left to right at the top of gear wheel 27, in Fig. 8. As the eccentric gear wheel 26 rotates twice to one rotation of the gear wheel 27, it is apparent that said gear wheel 27 will on one revolution intermesh with the teeth numbered 1 to 21 at the bottom of the gear wheel 27, while on the second revolution of said eccentric gear wheel 26 it will intermesh with the teeth numbered 1 to 21 at the top of said gear wheel 27. The fragments of the gear wheel 26 at the left and upper right of the diagrammatic view shown in Fig. 8 is solely for the purpose of showing how the teeth of the eccentric gear wheel 26 intermesh at different positions during the rotation of said gear wheels 26 and 27.

I believe I am the first to produce such a device as is herein set forth, and I do not wish to be limited to the details set forth and described, but desire that the scope of the appended claims may be construed to cover broadly my idea, or so broadly as the state of the art as it now exists may justify.

I claim:

1. In a cutting device, a frame, a pair of cutter rolls rotatively mounted on said frame, means for continuously rotating said cutter rolls during the operation of said device, means including a variable speed mechanism connected with said cutter rolls for determining the rate of speed of rotation of said cutter rolls, and means for synchronizing the speed of rotation of said cutter rolls, during the actual cutting operation, with the linear speed of travel of the material to be cut as it passes between said cutter rolls, said means including a transversely movable carriage associated with said variable speed mechanism and under the control of the operator of said cutting device, whereby different lengths of the material to be cut may be severed by operating said transversely movable carriage and said variable speed mechanism.

2. In a cutting device, a frame, a pair of cutter rolls rotatively mounted on said frame, means for continuously rotating said cutter rolls during the operation of said device, means including a variable speed mechanism connected with said cutter rolls for determining the rate of speed of rotation of said cutter rolls, and means for synchronizing the speed of rotation of said cutter rolls, during the actual cutting operation, with the linear speed of travel of the material to be cut as it passes between said cutter rolls, said means including a transversely movable carriage associated with said variable speed mechanism and under the control of the operator of said cutting device, whereby different lengths of the material to be cut may be severed by operating said transversely movable carriage and said variable speed mechanism, said transversely movable carriage being so arranged as to change the speed cycle of the cutter rolls when said carriage is moved transversely of the cutting device.

3. In a cutting device, a frame, a pair of cutter rolls rotatively mounted on said frame, means for continuously rotating said cutter rolls during the operation of said device, means including a variable speed mechanism connected with said cutter rolls for determining the rate of speed of rotation of said cutter rolls, and means for synchronizing the speed of rotation of said cutter rolls, during the actual cutting operation, with the linear speed of travel of the material to be cut as it passes between said cutter rolls, said means including a transversely movable carriage associated with said variable speed mechanism and under the control of the operator of said cutting device, whereby different lengths of the material to be cut may be severed by operating said transversely movable carriage and said variable speed mechanism, said transversely movable carriage being so arranged as to change the speed cycle of the cutter rolls when said carriage is moved transversely of the cutting device, and said cutter rolls having on one journal of each of said rolls a driving gear and a driven gear in mesh with each other, said gears being mounted on the journals of the cutter rolls and causing the rotation of said cutter rolls during the operation of the cutting device.

4. In a cutting device, a frame, a pair of cutter rolls rotatively mounted on said frame, means for continuously rotating said cutter rolls during the operation of said device, means including a variable speed mechanism connected with said cutter rolls for determining the rate of speed of rotation of said cutter rolls, and means for synchronizing the speed of rotation of said cutter rolls, during the actual cutting operation, with the linear speed of travel of the material to be cut as it passes between said cutter rolls, said means including a transversely movable carriage associated with said variable speed mechanism and under the control of the operator of said cutting device, whereby different lengths of the material to be cut may be severed by operating said transversely movable carriage and said variable speed mechanism, said transversely movable carriage being so arranged as to change the speed cycle of the cutter rolls when said carriage is moved transversely of the cutting device, and an independently controlled device for varying the variable speed mechanism at the will of the operator of the cutting device without moving said transversely movable carriage.

5. In a cutting device, a frame, a pair of cutter rolls rotatably mounted on said frame, means for continuously rotating said cutter rolls during the operation of said device, means including a variable speed mechanism connected with said cutter rolls for determining the rate of speed of rotation of said cutter rolls, and means for synchronizing the speed of rotation of said cutter rolls during the actual cutting operation with the speed of travel of the material to be cut as it passes between said cutter rolls, said last-mentioned means including a driven member operable by the variable speed mechanism, another driven member connected with said first-mentioned driven member and mounted on a shaft located transversely of said cutting device, a carriage movable transversely of said cutting device and associated with said shaft, a second shaft also transversely located in said cutting device and substantially parallel with said first-named shaft and adapted to be driven through intermeshing gears by said first-named shaft, said intermeshing gears being located in said transversely movable carriage, a gear wheel located on one end of said last-named shaft, another gear wheel intermeshing with said first-named gear wheel and located on the journal of the lower cutter roll, and an eccentric gear also carried by the journal of said lower cutter roll and adapted to mesh with a quick-return gear mounted on the journal of the upper cutter roll, whereby the two cutter rolls may be operated during the actual cutting operation at a speed synchronized with the linear speed of the material to be cut, the feed screw supplying transverse movement of said transversely movable carriage changing the speed cycle of the cutter rolls by changing the speed cycle of the above second-named shaft which drives the lower cutter roll, and also changing the speed of travel of the variable speed mechanism.

WILLIAM MAIER.